United States Patent [19]

Juy

[11] Patent Number: 4,961,720
[45] Date of Patent: Oct. 9, 1990

[54] FRONT DERAILLEUR FOR BICYCLES OR SIMILAR VEHICLES

[75] Inventor: Henri Juy, Dijon, France

[73] Assignee: Simplex S. A., Marsannay La Cote, France

[21] Appl. No.: 369,216

[22] Filed: Jun. 21, 1989

[30] Foreign Application Priority Data

Jun. 21, 1988 [FR] France .................. 88 08777

[51] Int. Cl.$^5$ .......................................... F16H 7/18
[52] U.S. Cl. ........................................ 474/80; 474/140
[58] Field of Search ................................ 474/77–82, 474/140, 144–147

[56] References Cited

FOREIGN PATENT DOCUMENTS 2705809 8/1977 Fed. Rep. of Germany ........ 474/80
2522609 9/1983 France .................................. 474/80

Primary Examiner—Thuy M. Bui
Attorney, Agent, or Firm—Eric P. Schellin

[57] ABSTRACT

The invention relates to the engineering sector of cycle accessories.

The derailleur in accordance with this invention is worthy of note as the rear part of the forks (1) (2) is formed to take a quick fixing system to provide for bracing them.

9 Claims, 1 Drawing Sheet

FRONT DERAILLEUR FOR BICYCLES OR SIMILAR VEHICLES

The invention relates to the engineering sector of cycle accessories.

Front derailleurs for bicycles are generally composed of a yoke which comprises two parallel forks linked to a drive mechanism so that the chain can be moved from a small diameter to a large diameter chainwheel and vice versa.

One problem which the invention aims to resolve is to simplify the fixing arrangement at the rear of the forks. In fact, all forks, whatever the type of derailleur, are connected together by an assembly comprising a screw inserted in a spacer barrel and working in conjunction with a nut. There are, therefore, three separate independent components. The fitting and removal times are therefore increased and the overall number of parts is increased.

Under these conditions, in order to solve the problem raised, the rear of these forks is formed to take a quick fixing system capable of ensuring bracing of them.

The problem can be solved to advantage by the system composed of a bolt in which each end has a groove working in conjunction with a tapered slot formed from one of the edges of the rear of each of the forks; the forks and/or the spacer bolt are made from a resillient material.

Another problem which the invetnion aims at solving is to facilitate shifting of the chain in particular from the small to the larger chainwheel which can sometimes be difficult in view of the big difference in the number of tooth for example.

To solve this problem the iner face of at least one of the forks is provided with means to facilitate the chain shifting from the small diameter to the large diameter chainwheel.

The problem raised is solved in the following way:

The means take the form of idling rollers.

The part of the fork or forks which takes the rollers is arranged in such a way that these rollers are tangential or almost tangential to the relevant side plates of the chain.

The rollers are arranged vertically or diagonally, oriented in the direction of movement of the chain for shifting gears.

The rollers are straight and/or tapered.

The invention is explained in greater detail below, using the attached drawings in which.

Figure 1:
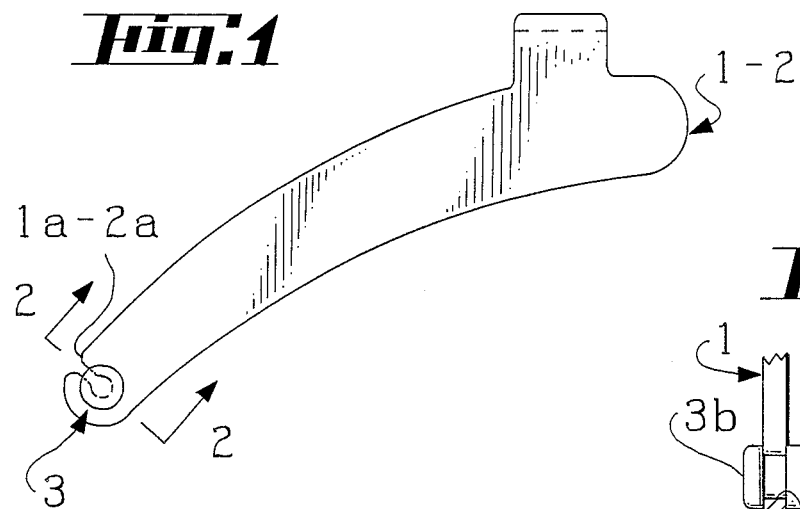
FIG. 1 is a front view of the outer part of a fork.
Figure 2:
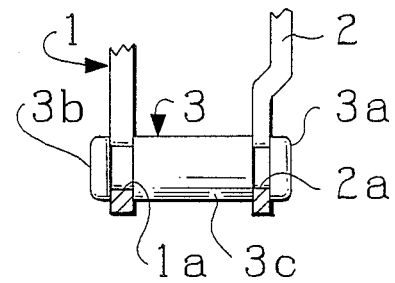
FIG. 2 is, on a larger scale, a cross section along the line 2—2 in FIG. 1.

In an already known way, the front derailleur is composed of a yoke consisting of two parallel forks (1) and (2). In accordance with the invention, in the example illustrated in FIGS. 1 and 2, the rear part of these forks (1) and (2) is connected and spaced by a bolt (3), each end of which has an annular groove (3a)-(3b) thus delineating a centre pin (3c) which acts as a spacer. Each of the grooves (3a)-(3b) works in conjunction with a tapered slot (1a)-(2a) made from the upper edge of each fork (1) and (2).

Made in this way, the bolt (3), in combination with the slots (1a)-(2a), forms a quick fixing system in a clipping arrangement.

The forks (1)-(2) and/or the bolt (3) can to advantage be made from a resilient material.

In accordance with another feature, the inner face of at least one of the forks (1) and/or (2) is provided with means to facilitate theh chain shifting in particular from the small diameter to the larger diameter chainwheel. This feature can, of course, be considered by itself or in combination with the abovementioned features relating to the quick fixing system for the rear of the forks.

Figure 6:
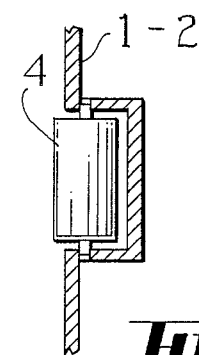
FIG. 6 is a cross section along the line 6—6 in FIG. 3.

In the examples illustrated, the facilities are made up of a set of independent idling rollers (4). Part (1a) and/or (2a) of the fork and/or forks (1)-(2) is arranged to allow the rollers to rotate as they are being fitted, in such a way that the rollers (4) are at a tangent to, or almost at a tangent to the relevant side plates of the chain. For instance, the various rollers (4) can be fitted inside a recess formed in the thickness of the relevant fork or forks (FIG. 6).

Figure 3:
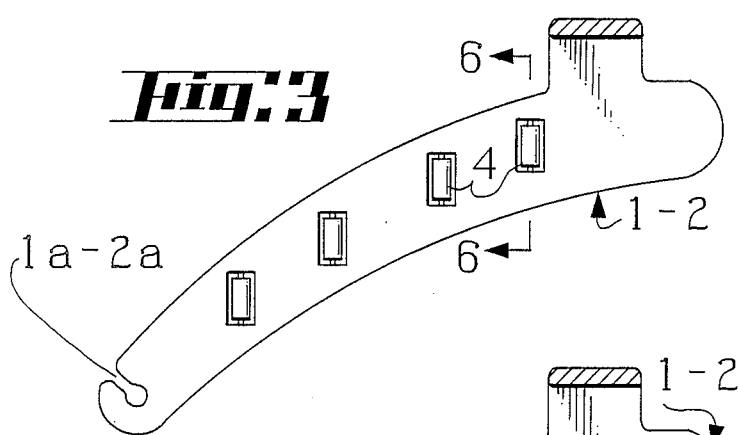
FIG. 3 is a front view of the inner part of the fork covered by the invention.
Figure 4:
FIGS. 4 and 5 are views similar to FIG. 3, showing other embodiments.
Figure 5:
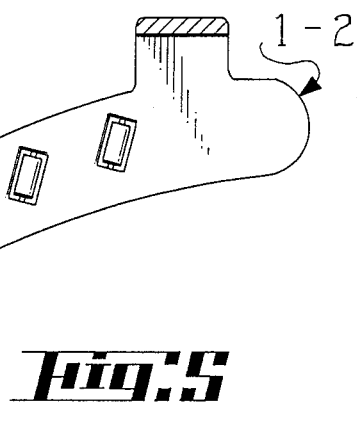

The rollers (4) are straight (FIG. 3) or tapered (FIG. 4). Similarly, the rollers can be arranged vertically (FIG. 3) or at an angle (FIG. 5). In this latter case, the rollers (4) are oriented in the direction of movement of the chain for changing gear in order to combine the two movements advantageously.

The advantages are clearly shown in the description.

We claim:

1. A front derailleur for a bicycle having a drive chain and gear plates of varying diameters comprising a bifurcated fork having parallel spaced legs comprising each of said legs having an aligned axial bore therethrough, each of said bores having axially aligned slots, a shaft, said shaft having two axial grooves, said two axial grooves being separated from each other by the dimension of the space of said legs, said slots being dimensioned approximately the diameter of the said shaft at its grooves whereby said shaft is capable of being inserted into said bores through said slots.

2. The front derailleur according to claim 1 wherein at least one of the parallel legs have a plurality of freely rotatable rollers mounted internally of the said legs whereby to faciliate the passage of said chain from the gear plates of lesser diameter to the gear plate of greater diameter.

3. The front derailleur of claim 2 wherein the rollers are adapted and constructed to impinge tangentially with respect to said plates.

4. The front derailleur according to claim 3 wherein the rollers are on vertical axes.

5. The front derailleur according to claim 3 wherein the rollers are arranged in an oblique manner oriented in the direction of movement of the chain for shifting speed.

6. A front derailleur for a bicycle having a drive chain as gear plates of varying diameter comprising a bifurcated fork having parallel spaced legs comprising at least one of the parallel legs having a plurality of freely rotatable rollers mounted internally of the said legs whereby to facilitate the passage of said chain from the gear plate of lesser diameter to the gear plate of greater diameter.

7. The front derailleur according to claim 6 wherein the rollers are adapted and constructed to impinge tangentially with respect to said plates.

8. The front derailleur according to claim 7 wherein the rollers are on vertical axes.

9. The front derailleur according to claim 7 wherein the rollers are arranged in an oblique manner oriented in the direction of movement of the chain for shifting speeds.

* * * * *